Patented Aug. 3, 1943

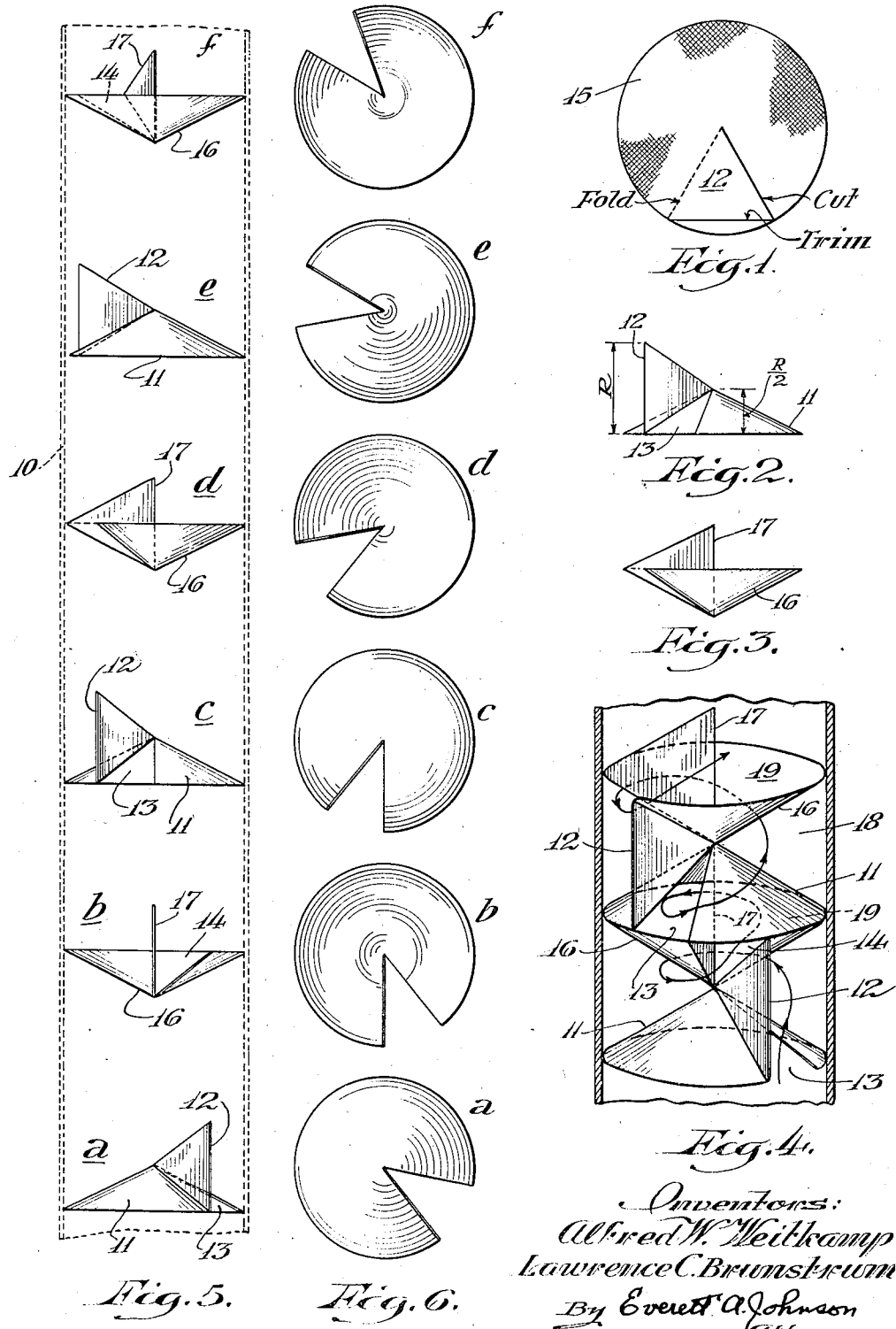

2,325,819

UNITED STATES PATENT OFFICE 2,325,819

VAPOR AND LIQUID CONTACTING APPARATUS

Alfred W. Weitkamp, Whiting, Ind., and Lawrence C. Brunstrum, Chicago, Ill., assignors to Standard Oil Company, Chicago, Ill., a corporation of Indiana Application April 30, 1941, Serial No. 391,147

3 Claims. (Cl. 261—94)

Our invention relates to vapor or gas and liquid contacting devices and more particularly is directed to apparatus such as fractionating columns, scrubbing towers, and the like.

The invention contemplates providing a column packed with regularly disposed foraminous packing of capillary material such as wire gauze, perforated plate and the like having openings of such size that liquid being treated will completely seal the openings. Larger openings which are not sealed by the liquid are provided for the passage of the vapors flowing spirally and upwardly within the column. The capillary material is so arranged in the column that the liquid will have a continuous path downward, and the vapor a continuous path upward, each phase without hindrance by the other. Further, we contemplate positioning within an elongated contacting zone a foraminous packing which provides the longest possible path of contact between the two phases. Woven wire is a satisfactory material if the mesh is of such size as to be sealed by the liquid. The size of the wire and the size of the mesh, therefore, are governed by the characteristics and amount of liquid present within the zone.

More specifically our invention is an improvement over the contacting apparatus described in Stedman Patent 2,227,164. It relates to an improved method of fabrication and assembly and improved design for wire gauze packing for laboratory columns. Our improved design provides a vertical liquid baffle between and within successive cells whereby all the vapors are directed in a circular path within the annular space between successive cells and travel in a substantially spiral path from bottom to top of the column. The baffle can be of capillary or non-capillary material. By suitable modification and arrangement of alternate baffles, the direction of the vapors between successive cells can be reversed. Likewise, the successive baffles can be integral with each other but separate from the cones.

It is an object of our invention to provide a packing which retains a minimum amount of liquid. Uniform distribution of both liquid and vapor throughout the available cross-section of the column is another object. A further object is to provide a column with maximum contact between liquid and vapor over an extended area.

A further object is to provide a contacting device which is of simple and inexpensive construction. Another object is to provide a packing comprising a plurality of superposed capillary cells which are free to adjust themselves to the interior surface of the column. It is another object of our invention to provide means for controlling the flow of vapors between and within the cells. Still another object is to provide a packing which can be fabricated equally well in short or long sections. An additional object is to provide a column of increased efficiency. These and other objects will become apparent as the description of our invention proceeds.

Our invention will be understood from the following description and the accompanying drawing which forms a part thereof.

Figure 1 shows the blank from which the cones can be formed;

Figures 2 and 3 are views of the cones and baffle formed from the wire blank of Figure 1;

Figure 4 is a view in perspective of a portion of the column fabricated in accordance with our invention;

Figure 5 is a schematic view in elevation showing the positions of the elements; and Figure 6 is a series of plan views of the elements of Figure 5 showing the relative positions of the cell openings.

Our invention is directed to the control of the flow of the ascending vapors in the space between and within the cells. In the prior art packing the vapors upon entering this space subdivide and flow across the column to the next opening spaced only 180 degrees from the lower opening or inlet to the space. By our invention the ascending vapors are caused to flow in a single stream all the way around the annular space between cells and within each cell.

Referring to the drawing, reference numeral 10 designates the wall of the column and vapors or gases enter a lower portion of the column by means not shown. The column 10 encloses a plurality of superposed elements or cones designed and constructed according to our invention as shown in Figures 2 and 3. One element comprises a conical disc 11 having an attached external baffle 12 adjacent the vapor opening 13 and extending upwardly. The vapor opening 13 and external baffle 12 are produced by cutting a radial slit in the circular blank 15 of Figure 1 and turning a wing or segment 12 of the disc toward the apex, the peripheral dimension of the segment being substantially equal to at least twice the altitude of the cone 11. In a subsequent operation the disc is formed into a cone 11 of smaller diameter, resulting in substantial closure of the said vapor opening, which can be trimmed to any desired size. If desired, the trimming can be combined with the final forming operation. Obviously, the die for forming the cones must be slotted to accommodate flap or wing 12. This cone 11 is illustrated by Figures 2, 5a, 5c, and 5e. Another element comprises a cone 16 having a segment 17 turned downwardly toward the base of the cone. With suitable modification of the die described above, this element can be manufactured in a manner similar to that used in making cone 11. This cone 16 is illustrated in Figures 3, 5b, 5d, and 5f.

In fabricating the column, cones 11 and 16 are placed apex-to-apex with the radial edge of the external baffle 12 integral with cone 11 in contact with the cut edge of vapor opening 14 of cone 16. A similar cone 11 is disposed base-to-base with the cone 16 and an edge of internal baffle 17 engages the cut edge of vapor opening 13. Thus a radial baffle is formed in the space 18 between the cones and within the cell 19 formed by cones 11 and 16 disposed base-to-base. The vapor issuing into the space 18 between cones 11 and 16 from vapor opening 13 of the cell below is forced to pass completely around the space 18 between the cells before entering the upper cell through the vapor opening 14. The vapors entering cell 19 by way of opening 14 pass around internal baffle 17 within the cell in a substantially spiral path before leaving the cell by vapor opening 13. In the embodiment illustrated by the drawing, each cone has a height equal to about one-half the radius of the column and the vertical edge of each baffle is a length equal to twice the height of the cone. The leading edges of each successive baffle opening are approximately 40 degrees apart, and hence the vapors travel about 320 degrees within each cell and between each cell. If desired, the baffles 12 and/or 17 can be disposed transverse to the longitudinal axis of the column to effect a more compact spiral vapor path. Thus, all the openings 13 and 14 can be disposed one above the other and transverse of the baffle to give 360 degrees vapor travel within and between the cells. Likewise, the internal baffles 17 can be vertical and the external baffles 12 inclined.

Each wall-contacting edge fits the column at least as closely as the mesh of the gauze. If it were otherwise the liquid would race down the walls of the column and efficiency would be lost. Small differences in the diameter of the column are overcome by making the element slightly oversize. The spring of the disc holds it in place, compensates for any variation in the column, and assures a very tight fit.

The cones are inserted into the column with a ramrod. No fastening of the individual cones is necessary and thus we eliminate necessity for welding base-to-base to form an integral unit. Likewise, proper grinding to insure correct dimensions of the welded packing is avoided. The spring of the metal holds the cones permanently in place and a very tight fit is insured. This cannot be true of a rigid packing prepared by welding and grinding.

In operation, reflux or liquid introduced into the top of the column 10 flows over the capillary material and seals the openings. A cone 11 and an adjacent lower cone 16 together with baffles 12 and 17 form one unit. The liquid flows radially inwardly in the top cone 16, vertically downward in external baffle 12, radially outwardly in the lower cones 11 and vertically downward in internal baffle 17. This flow continues until the liquid reaches the bottom of the column 10. The vapor enters at a point near the bottom of the column, flows upwardly following a substantially spiral path from bottom to top. The vapor flows from the outlet 13 of the lower cone 11 into the annular space 18 between the cones and thence to the inlet opening 14 of the upper cone 16. The vapor openings 13 and 14 of any two cones 11 and 16 respectively, placed apex-to-apex, are disposed transverse of the baffle along an elongated spiral or a substantially vertical line. The flow in the annular space 18 between these cones is directed in a substantially circular path by the external baffles 12 therebetween. Similarly the internal baffles cause the vapors to follow a circular path within the cells 19. The inlet and outlet openings 14 and 13, respectively, of any given cell formed by the cones 11 and 16, base-to-base, likewise are disposed along the elongated spiral about the axis of the column 10 or in a substantially vertical line. In the embodiment shown, each successive baffle is about 40 degrees from the baffles in the adjacent cones.

Our design and fabrication results in improved contact between ascending vapor and descending liquid with a very substantial increase in efficiency over other packings of this class. These advantages in efficiency are obtained although the new packing is less expensive and no more difficult to fabricate than the ordinary conical pattern packing of the prior art.

In the embodiment shown all the cones are of a pattern to give a spiral flow. If the baffle 12 is formed by folding a segment so as to form an opening clockwise of the baffle and the upper edge of the external baffle 12 placed in contact with the folded edge of the vapor opening 14 instead of the cut edge, the path of the vapor becomes circular between cells as before but the path reverses on itself in each successive baffled zone 18 and cell 19. Thus the vapor having entered the baffled zone 18 from vapor opening 13 travels in a circular path as it did below in cell 19 but in the reverse direction. This results in greater efficiency by further avoiding channelling of the vapor while increasing the degree and amount of contact with the liquid. Other modifications and arrangements will be apparent from the description.

Each element in the illustrated embodiment comprises a conical disc. However, a pyramidal disc can be used with the necessary modification of the column. Therefore, "cone" as used in the specification and claims is intended to include pyramids and cones.

Although we have described our invention with reference to certain embodiments thereof, it is contemplated that various changes can be made in details within the scope of our claims without departing from the spirit of our invention. It is, therefore, understood that our invention is not to be limited to the specific details shown and described.

We claim:

1. A fractionating apparatus for liquids comprising a column and a plurality of baffled cells therewithin between pairs of cones of capillary material arranged alternately base to base and apex to apex, the capillary openings of which are sealable with the liquid being fractionated, baffles of liquid-conducting capillary material extending transversely across the annular channels between adjacent cells, baffles of liquid conducting capillary material extending transversely across the circular channels within said cells, said baffles both between said cells and within said cells being in capillary liquid conducting contact with at least one of the adjacent cones and vapor openings in said cones adjacent said baffles whereby ascending vapors being fractionated are forced to follow a tortuous path upward thru the apparatus in a substantially undivided stream.

2. The apparatus of claim 1 wherein said capillary material is woven wire.

3. The apparatus of claim 1 wherein the said vapor openings are in the form of segments of said cones.

ALFRED W. WEITKAMP.
LAWRENCE C. BRUNSTRUM.